US011159375B2

(12) United States Patent
Hu et al.

(10) Patent No.: US 11,159,375 B2
(45) Date of Patent: Oct. 26, 2021

(54) UPGRADE OF IT SYSTEMS

(71) Applicant: International Business Machines Corporation, Armonk, NY (US)

(72) Inventors: Lian Xue Hu, Beijing (CN); Qi Cheng Li, Beijing (CN); Soumitra Sarkar, Cary, NC (US); Lijun Mei, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/430,518

(22) Filed: Jun. 4, 2019

(65) Prior Publication Data

US 2020/0389357 A1 Dec. 10, 2020

(51) Int. Cl.
*H04L 12/24* (2006.01)
*G06Q 30/02* (2012.01)

(52) U.S. Cl.
CPC ..... *H04L 41/0826* (2013.01); *G06Q 30/0283* (2013.01); *H04L 41/082* (2013.01); *H04L 41/0853* (2013.01); *H04L 41/12* (2013.01)

(58) Field of Classification Search
CPC ............. H04L 41/0823; H04L 41/0826; H04L 41/082; H04L 41/0853; H04L 41/12; G06Q 30/08; G06Q 30/0283; G06Q 30/0631; G06Q 40/04; G06F 8/65
See application file for complete search history.

(56) References Cited

U.S. PATENT DOCUMENTS 6,169,994 B1 1/2001 Lennert et al.
7,113,901 B1 9/2006 Schaumont et al.
7,140,013 B2 * 11/2006 Te'eni .................. G06F 8/61
          717/173
7,219,081 B1 5/2007 Davis et al.
7,483,970 B2 * 1/2009 Anuszczyk ............... G06F 8/70
          709/223
7,702,497 B2 * 4/2010 Dombrowski ......... G06Q 30/06
          703/22

(Continued)

FOREIGN PATENT DOCUMENTS

CN 102436528 A 5/2012

OTHER PUBLICATIONS

Wineman Technology Incorporated, "3 Reasons to Reuse Not Replace Your Legacy Test System," Oct. 1, 2013, 4 pages.

(Continued)

*Primary Examiner* — Nam T Tran
(74) *Attorney, Agent, or Firm* — Patterson + Sheridan, LLP

(57) ABSTRACT

A method, computer program product, and system for upgrading an IT system are provided. The method comprises: determining a plurality of existing components of the IT system; determining at least one user component based on a user requirement; building a structural topology of the IT system in accordance with the plurality of existing components and the at least one user component, the structural topology comprising the plurality of existing components, at least one connection among the plurality of existing components, and the at least one user component with its conditional connection, the conditional connection comprising the dependency of the at least one user component; and providing at least one upgrade recommendation for the IT system in accordance with the structural topology.

20 Claims, 6 Drawing Sheets

(56) References Cited

U.S. PATENT DOCUMENTS

| | | | | |
|---|---|---|---|---|
| 8,595,700 | B2* | 11/2013 | Huang | G06F 9/547 |
| | | | | 717/120 |
| 8,898,676 | B2* | 11/2014 | Hiltgen | G06F 9/45558 |
| | | | | 718/106 |
| 9,361,092 | B1* | 6/2016 | Bai | H04L 41/082 |
| 9,412,080 | B2* | 8/2016 | Raviola | G06Q 10/06 |
| 9,557,879 | B1* | 1/2017 | Wang | H04L 41/12 |
| 9,565,080 | B2* | 2/2017 | Jain | H04L 67/327 |
| 9,575,739 | B2* | 2/2017 | Bhattiprolu | G06F 8/61 |
| 9,639,341 | B2* | 5/2017 | Freiter | G06F 8/65 |
| 10,608,911 | B2* | 3/2020 | Nickolov | H04L 43/0817 |
| 2002/0198773 | A1 | 12/2002 | Belluomini et al. | |
| 2005/0138603 | A1* | 6/2005 | Cha | G06F 8/53 |
| | | | | 717/120 |
| 2007/0088630 | A1* | 4/2007 | MacLeod | H04L 41/0853 |
| | | | | 705/28 |
| 2019/0318288 | A1* | 10/2019 | Noskov | G06Q 10/06393 |
| 2020/0106876 | A1* | 4/2020 | Keen | H04L 51/063 |

OTHER PUBLICATIONS

Abelardo Jara-Berrocal and Ann Gordon-Ross, "Hardware Module Reuse and Runtime Assembly for Dynamic Management of Reconfigurable Resources," 978-1-4577-1740-6/11/ © 2011 IEEE.

* cited by examiner

ROUTE1 COSTS:
$7+13.5+6.5=$27

ROUTE2 COSTS:
$15+15=$30

UPGRADE OF IT SYSTEMS

BACKGROUND

The present application relates to IT system management, and more specifically, to method, system and computer program product for upgrading IT systems.

Often times, an IT system of an organization needs upgrading from time to time to pursue greater efficiencies and cost savings, which may simply because the exiting IT system will no longer meet needs of the organization—either business demands of the organization may outgrow the system, and the system may become too slow, or the technology of the system may become outdated. To maximize the cost savings of IT system upgrades, reuse of existing components of the IT system is an important way.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment of the present invention, there is provided a computer implemented method. The method comprises: determining a plurality of existing components of the IT system; determining at least one user component based on a user requirement; building a structural topology of the IT system in accordance with the plurality of existing components and the at least one user component, the structural topology comprising the plurality of existing components, at least one connection among the plurality of existing components, and the at least one user component with its conditional connection, the conditional connection comprising the dependency of the at least one user component; and providing at least one upgrade recommendation for the IT system in accordance with the structural topology.

Computer program products and computer systems are also provided.

These and other features and advantages of the present invention will be described in, or will become apparent to those of ordinary skill in the art in view of, the following detailed description of the example embodiments of the present invention.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
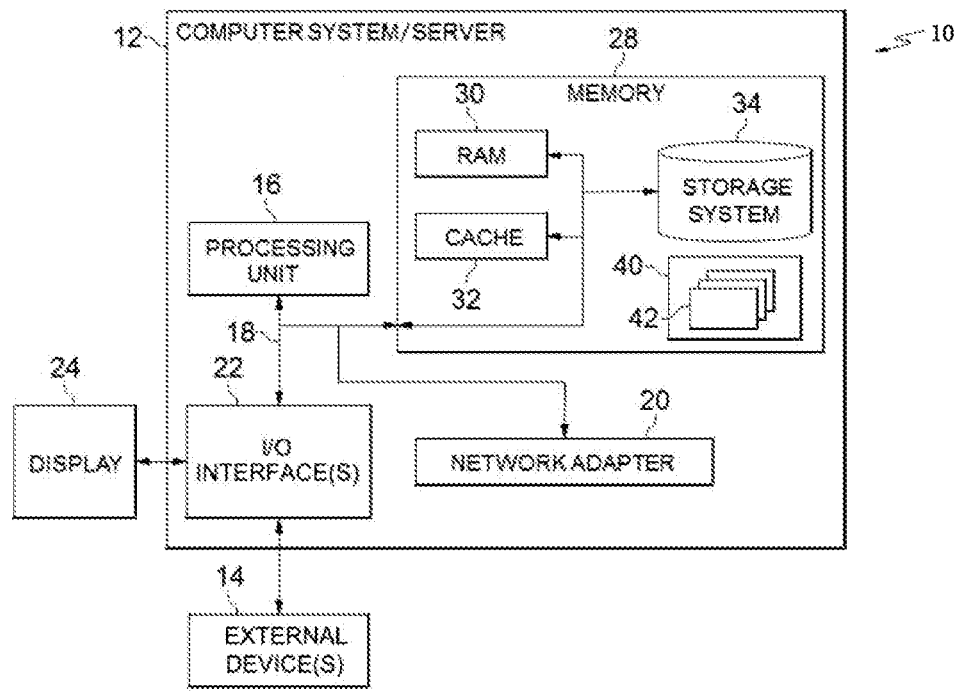
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

As mentioned in the background, reuse of existing components of the IT system is an important way to maximize the cost savings of the IT system upgrades. However, due to the complexity of an IT system, dependencies and compatibilities among different hardware and/or software typically are very complicated. To better reuse existing components of the IT system and provide feedback on how the existing components would be utilized, it would be beneficial to perform better dependency and interoperability analysis of hardware and software of the IT system and discover useful information as the feedback.

Embodiments of the invention can be deployed on cloud computer systems which will be described in the following. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
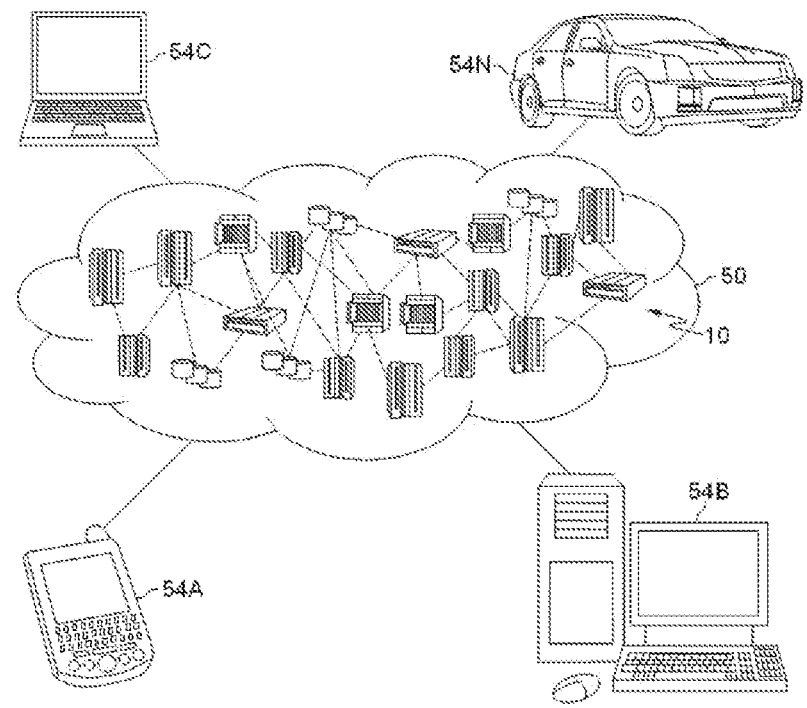
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
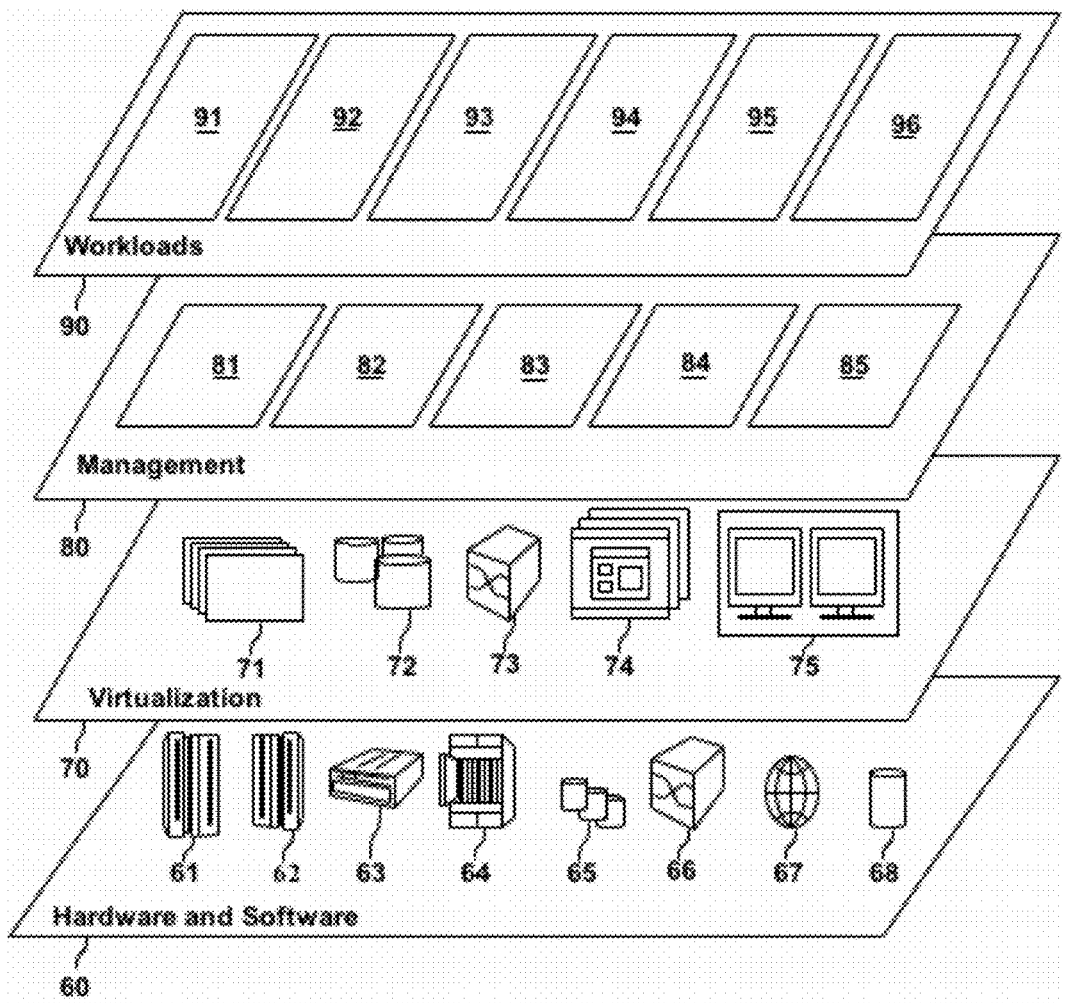
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and IT system upgrade 96 according to embodiments of the invention.

Figure 4:
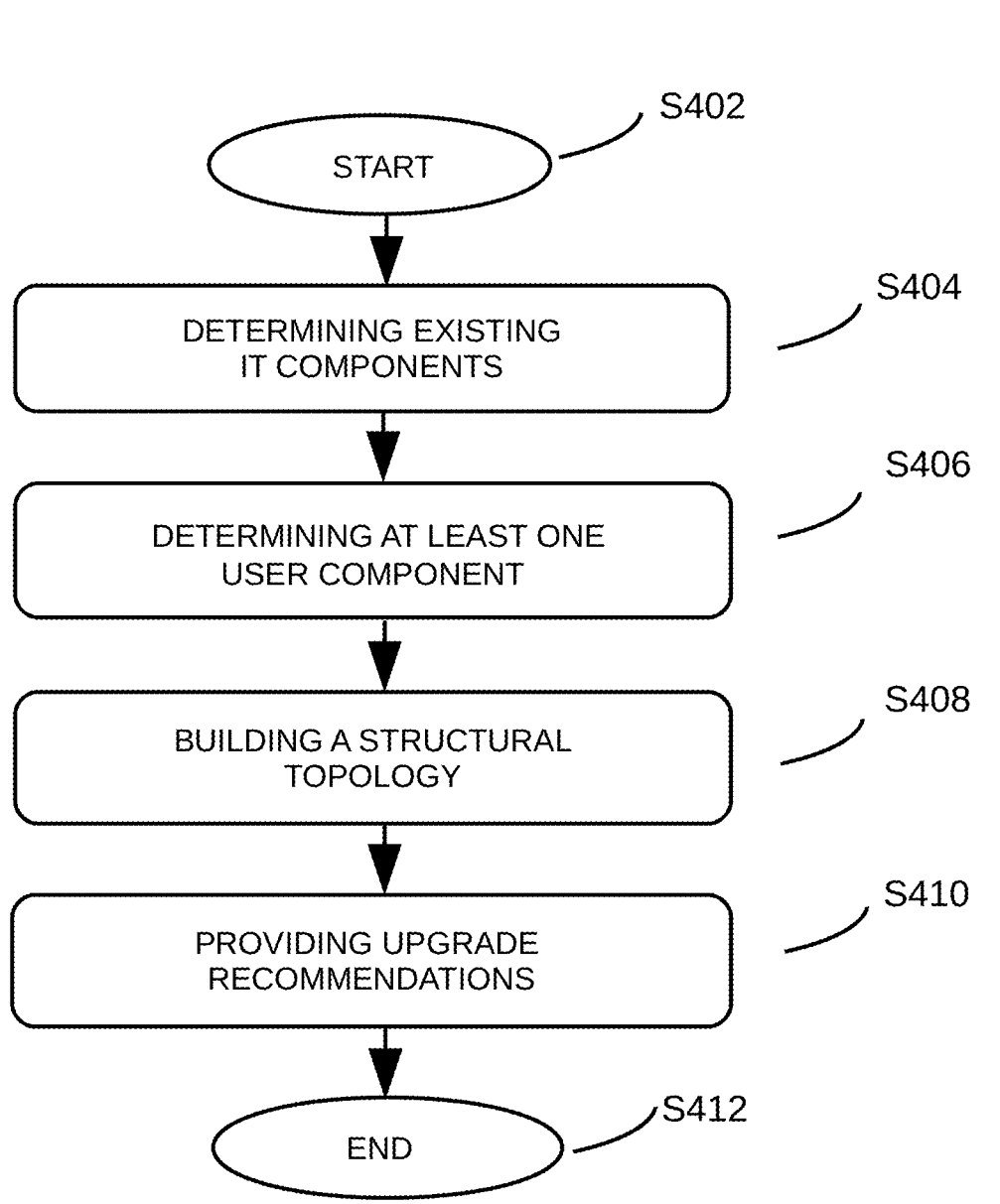
FIG. 4 depicts a flowchart of an exemplary method 400 for upgrading an IT system according to an embodiment of the present invention.

Referring now to FIG. 4, a flowchart of an exemplary method 400 for upgrading an IT system according to an embodiment of the present invention is depicted. In the following, the method 400 will be described together with reference to FIG. 5 for a better understanding, however the reference of FIG. 5 is merely for the purpose mentioned above and will not adversely limit the scope of the invention.

Figure 5:
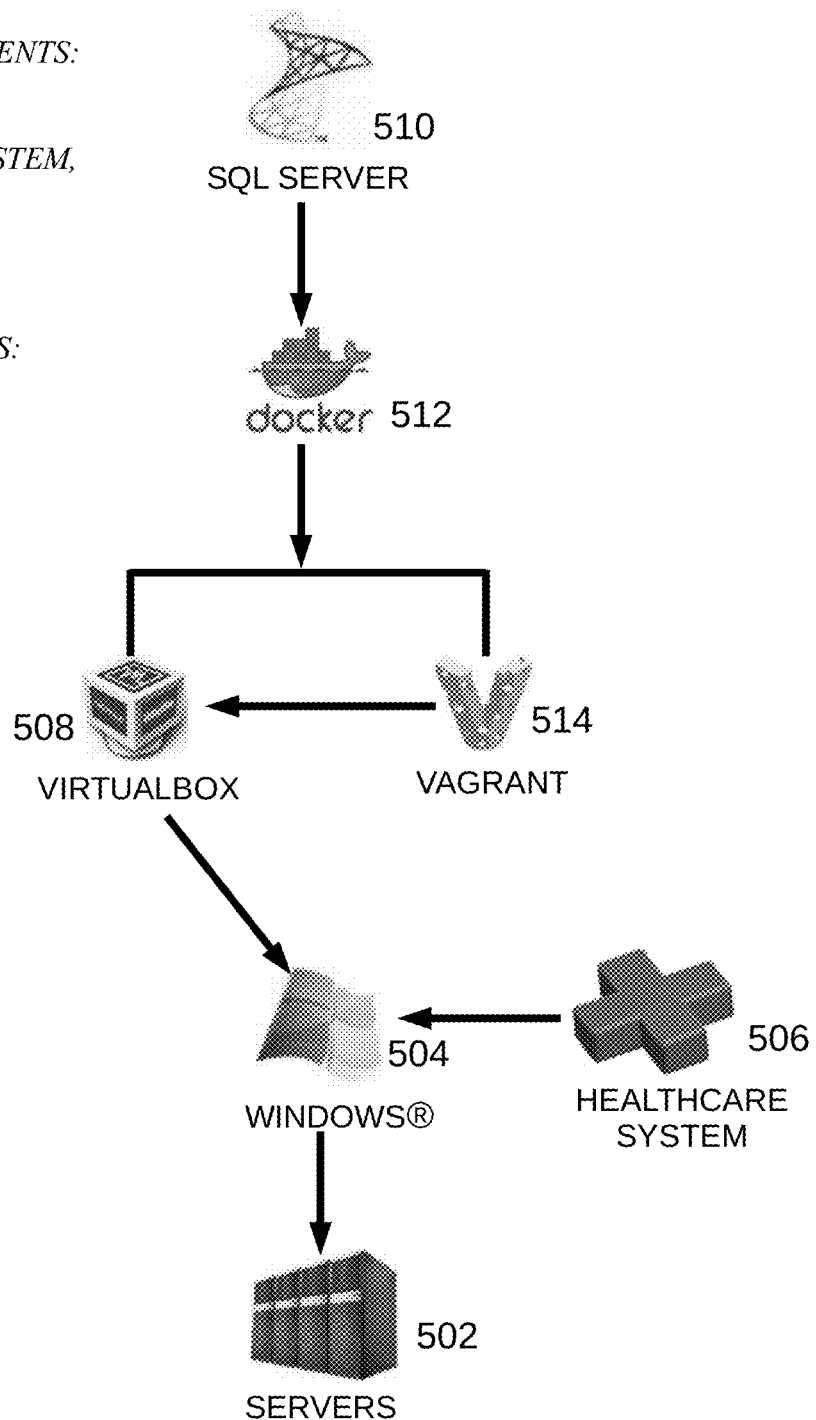
FIG. 5 depicts a visual presentation of a collection of existing components of an IT system and dependencies of the existing components and user components.

Referring now to FIG. 5, which depicts a visual presentation of a collection of different components (hardware components and software components) of an IT system, together with the dependencies among the different components. In the visual presentation of FIG. 5, different icons (502, 504, 506, 508, 510, 512 and 514) represent different components, and links (lines with arrows) among them represent dependencies among the different components. For example, the line with arrow between Windows® 504 and Healthcare System 506 shows that Healthcare System 506 is dependent on Windows® 504, the lines with arrows among Docker 512, VirtualBox 508 and Vagrant 514 shows that Docker 512 depends on VirtualBox 508 and Vagrant 514, and Vagrant 514 depends on VirtualBox 508. It should be pointed out that the visual presentation of FIG. 5 is merely for the purpose of illustration, and dependencies among the different components shown in FIG. 5 are merely for the purpose of a simplified illustration and should not adversely limit the scope of the invention.

Turning back to FIG. 4, the method 400 for upgrading an IT system starts at step S402. Then in the following step S404, a plurality of existing components of the IT system is determined. According to an embodiment of the present invention, the plurality of existing components may be determined from a list of existing components of the IT system retrieved from a database. According to another embodiment of the present invention, the existing components may be determined by reading one or more system configuration files. The determination of a plurality of existing components may utilize any technologies existing nowadays or developed in the future. In the example of FIG. 5, the determined existing components are listed in the left above of FIG. 5, also shown in the visual presentation as servers 502, Windows® Operating System 504, healthcare system 506, VirtualBox 508, and SQL server 510. According to an embodiment of the present invention, the determined existing components may further comprise their respective version information e.g., Windows® 7, healthcare system 8.2, VirtualBox 4.3 and SQL server 7.1. According to an embodiment of the present invention, the determination of the plurality of existing components may further comprise extracting, for the plurality of existing components, respective metadata. Metadata may be extracted from any available source, e.g. online documentation. The extracted metadata may comprise the following information: 1) dependency metadata, which describes dependency information of the plurality of existing components, and 2) compatibility metadata, which describes compatibility information of the plurality of existing components. With the extracted metadata, dependency and compatibility of the plurality of existing components may be further verified.

Then, the method 400 proceeds to step S406, in which at least one user component is determined based on a user requirement to upgrade the IT system. According to an embodiment of the present invention, the at least one user component may be determined based on a user requirement received from a user of the IT system. According to another embodiment of the present invention, the at least one user component may be determined based on a user-requirement document. According to an embodiment of the present invention, a natural language process (NLP) technology called name entity recognition (NER) may be used for the determination of the at least one user component. For example, the user requirement received from the user in a natural language form is 'the current IT system needs to be upgraded to run SQL server in a docker container'. By applying NER, name entities 'SQL server' and 'docker' are identified. Further 'docker' is determined as user component as 'SQL server' has already been identified as existing components. According to other embodiments of the present invention, other text or speech processing technologies may be used for the determination of the at least one user component. The determination of the at least one user component based on a user requirement may utilize any technology existing nowadays or developed in the future. According to an embodiment of the present invention, the determination of the at least one user component may further comprise extracting respective metadata for the at least one user component. Respective metadata for the at least one user component may be extracted from any available sources, e.g. online documentations. The extracted metadata may comprise the following information: 1) dependency metadata, which describe dependency information of the at least one user component and the plurality of existing components, and 2) compatibility metadata, which describe compatibility information of the at least one user component and the plurality of existing components. With the extraction of metadata, one or more further user components may be further determined. Based on the extraction of metadata, dependency and compatibility of the at least one user component and the plurality of existing components may further be verified. In the example of FIG. 5 where the user requirement received from the user is 'to run SQL server on a Docker container', the at least one user component determined is Docker, as listed in the left below of FIG. 5, also shown in the visual presentation as Docker 512. With the extracted metadata, component Vagrant 514 is further determined as user component as Docker 512 depends on it. With the extracted metadata, dependency and compatibility of Docker 512, Vagrant 514 and existing components may be further verified.

Then, the method 400 proceeds to step S408, where a structural topology of the IT system is built in accordance with the plurality of existing components and the at least one user component, the structural topology comprises the plurality of the existing components, at least one connection among the plurality of existing components, and the at least one user component with its conditional connection, the conditional connection comprises the dependency of the at least one user component. In the following, for the purpose of better illustration, the process of building the structural topology of the IT system will be discussed with reference to FIG. 6A to 6D, where the structural topology is in the form of graphs. However, it should be pointed out that FIG. 6A to 6D are merely for the purpose of simplified illustration, structural topology may adopt any other suitable forms existing nowadays or developed in the future. It should also be pointed out that the reference to FIG. 6A to 6D are merely for the purpose of simplified illustration and better understanding, it should not adversely limit the scope of the invention.

Referring now to FIG. 6A to 6D, which depict the process of building a structural topology of an IT system in accordance with its existing components and user components in connection with the example of FIG. 5. As discussed above, in the example of FIG. 5, the plurality of existing components determined in step S404 comprises servers 502, Windows® 504, healthcare system 506, VirtualBox and SQL server 510. The at least one user component determined in step S406 based on the user requirement comprises Docker 512 and Vagrant 514. According to an embodiment of the present invention, dependency and compatibility of the existing components and the at least one user components may be verified. For the purpose of simplified illustration, in the following description, dependency and compatibility of the components listed above are assumed to have been verified. According to an embodiment of the invention, in the case that dependency or compatibility is not verified, those components not verified may be simply dropped from consideration. For example, if the version of the existing component VirtualBox 508 is not compatible with the existing component Windows®, the existing component VirtualBox will be dropped from consideration, and a compatible version of VirtualBox that is compatible with the existing component Windows® will be further determined as a user component.

Figure 6A:
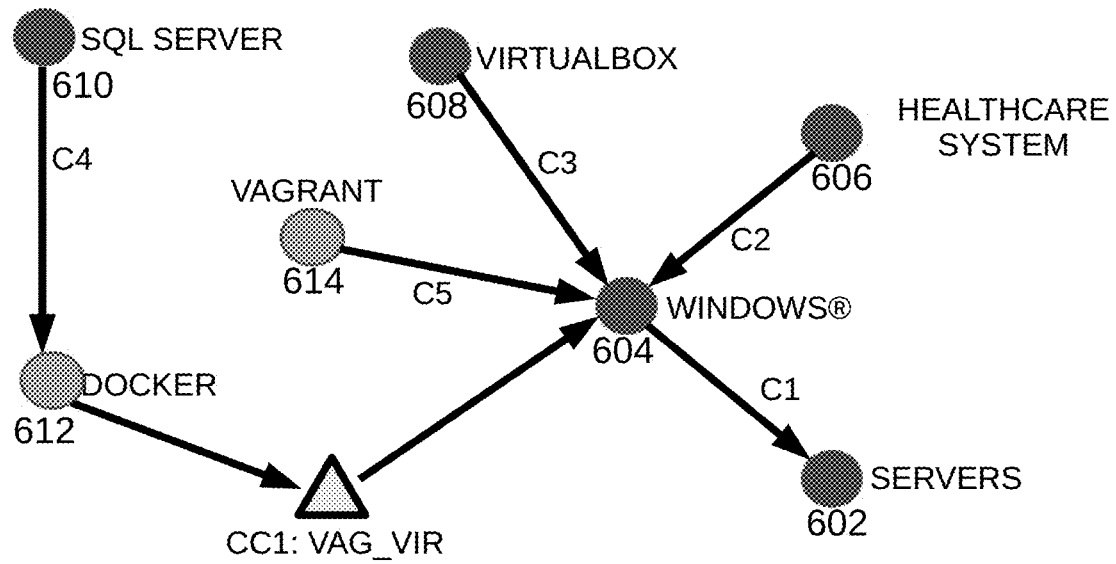
FIG. 6A-6D depict the process of building a structural topology of an IT system in accordance with its existing components and user components in connection with the example of FIG. 5.

Now referring to FIG. 6A, a graph is used to build the structural topology of the IT system. As aforementioned, the structural topology comprises the plurality of the existing components, at least one connection among the plurality of existing components, and the at least one user component with its conditional connection, the conditional connection comprises the dependency of the at least one user component. According to an embodiment of the present invention, the dependency of the at least one user component comprises a collection of all dependencies that the at least one user component is dependent on. For the example in FIG. 6A, in the graph, existing components are shown as dark nodes in the graph: node 602 (servers), node 604 (Windows®), node 606 (healthcare system), node 608 (VirtualBox), and node 610 (SQL server). User components are shown as grey nodes in the graph: node 612 (Docker) and node 614 (Vagrant). Connections C1 between node 602 (servers) and node 604 (Windows®) represents the dependency of node 602 and node 604, i.e., node 604 is dependent on node 602. Similarly, connection C2, C3 and C4 represent respective dependencies of node 606 and node 604, node 608 and node 604, node 610 and node 612. Connection C5 represents the dependency of node 614 (user component Vagrant) and node 604. A conditional connection CC1 comprises a virtual node that represents the dependency of node 612 (user component Docker) and node 604 and corresponding connections (left connection between node 612 and the virtual node and right connection between the virtual node and node 604), as shown in FIG. 6A as the triangle node CC1: Vag_Vir and its left connection and its right connection. The conditional connection represents that node 612 is dependent on node 614 (Vagrant) and node 608 (VirtualBox), i.e., a collection of all the dependencies that node 612 is dependent on. According to an embodiment of the present invention, the structural topology of the IT system may be built in accordance with the metadata extracted during the determination of the plurality of existing components and the at least one user component. Further, according to an embodiment of the invention, dependency and compatibility of the plurality of existing components and the at least one user components may be verified in accordance with the extracted metadata which comprise dependency information and compatibility information of the plurality of existing components and the at least one user component. According to an embodiment of the present invention, the verification is only performed for the type of nodes that are connected by a connection in the graph.

Figure 6B:
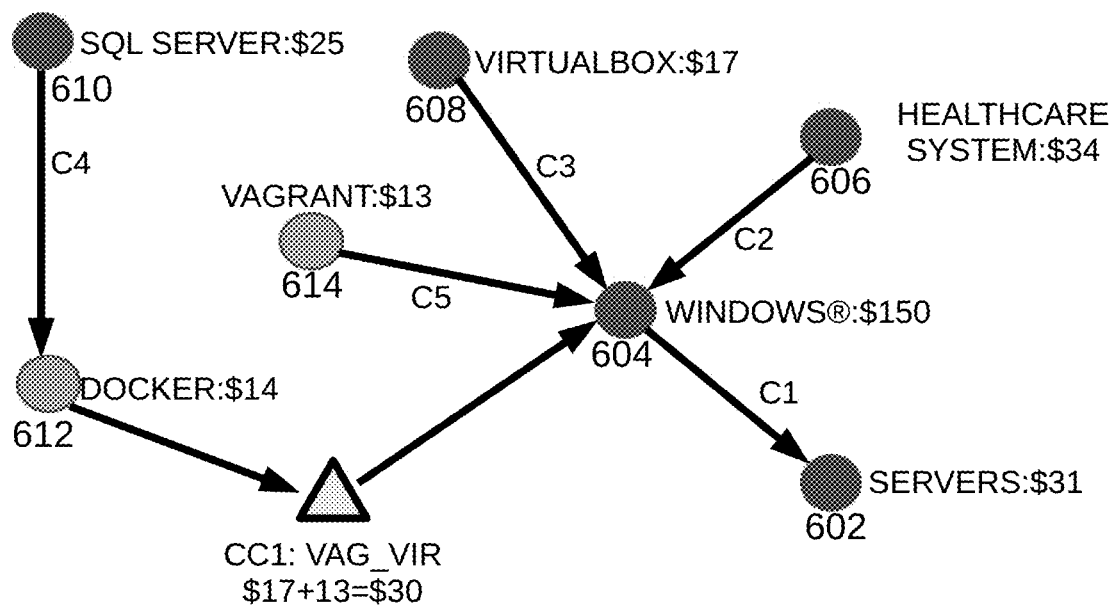

According to an embodiment of the present invention, respective costs for the plurality of existing components and the at least one user component are further received and associated with the plurality of existing components and the at least one user component in the structural topology of the IT system. According to an embodiment of the present invention, the respective costs may be embedded in the extracted metadata. According to another embodiment of the present invention, the respective costs may be received from the user. Referring now to FIG. 6B, which shows the updated structural topology of the IT system after the respective costs have been associated with the plurality of existing components and the at least one user component. As shown in FIG. 6B, for example, the cost of node 612 (user component Docker) is shown with the value $14, the cost for node 614 (user component Vagrant) is shown with the value $13, and the cost for node 608 (existing component VirtualBox) is shown with the value $17. For the conditional connection CC1, as the dependency shows that node 612 (Docker) is dependent on node 614 (Vagrant) and node 608 (VirtualBox), the cost for the virtual node comprised in the conditional connection CC1 is the accumulation of the costs of all the dependencies that node 612 is dependent on, i.e., the accumulation of the costs of node 614 and the cost of node 608, which is $13+$17=$30, as shown in FIG. 6B.

Figure 6C:
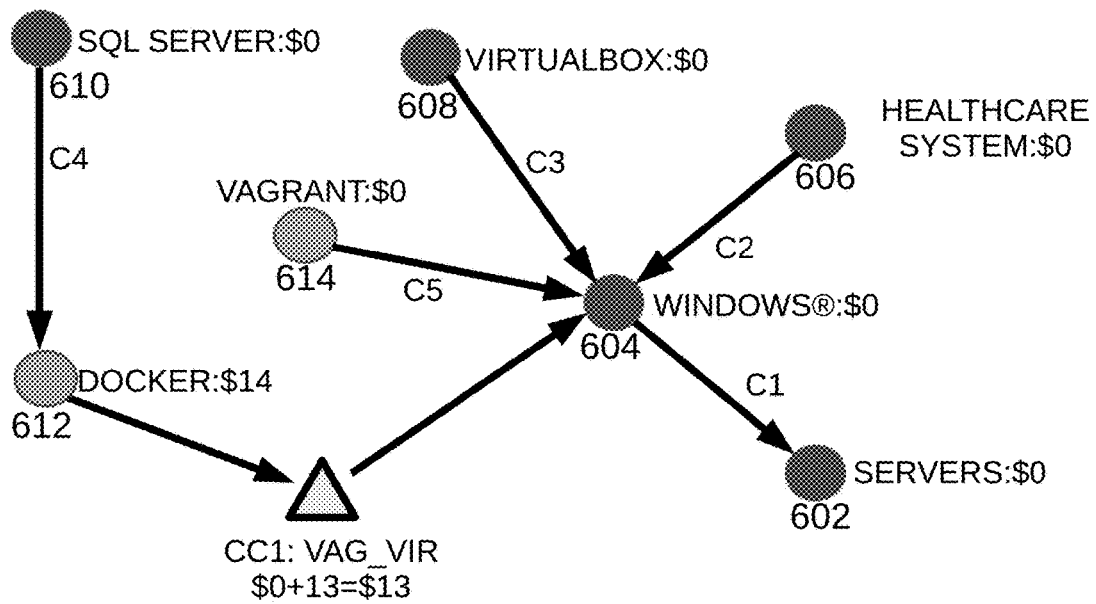

According to an embodiment of the invention, the respective costs for the nodes corresponding to the plurality of existing components are set to zero as they already exist and thus there is no need to calculate them. And the costs for the at least one user component should be remained unchanged as they do not exist in the IT system. Based on the principle, the updated structural topology of the IT system is shown in FIG. 6C, in which the costs for the nodes corresponding to the plurality of existing components (node 602, node 604, node 606, node 608, node 610) are set to zero. The cost for node 612 (user component Docker) remains unchanged. The cost for the virtual node comprised in the conditional connection CC1 is the accumulation of the costs of all the dependencies that node 612 is dependent on, i.e., the accumulation of the costs of node 614 and the cost of node 608, which is $13+$0=$13. The cost for node 614 (user component Vagrant) is also set to zero as its cost has been accumulated to the cost of the virtual node comprised in the conditional connection CC1.

Figure 6D:
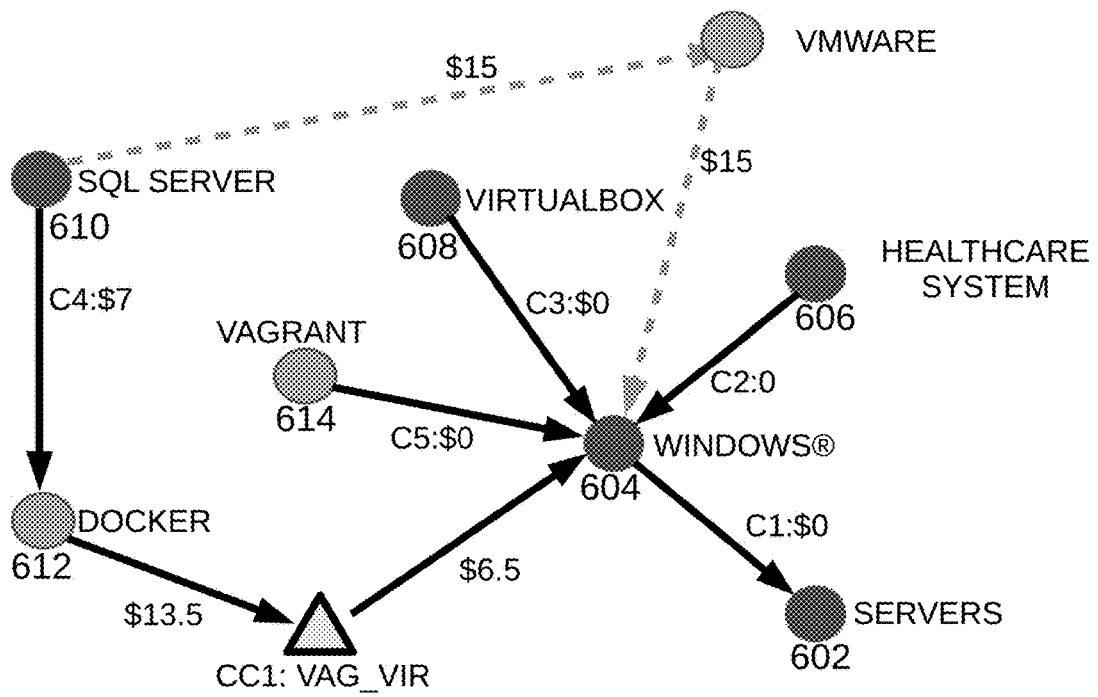

According to an embodiment of the invention, the costs for respective connections may be set to half of the summation of the cost of the two nodes that the respective connection is connected to. Based on the principle, the updated structural topology of the IT system is shown in FIG. 6D, in which, the cost of connection C1 is half of the summation of the cost of node 602 and node 604, which is $0, the cost of connection C4 is half of the summation of the cost of node 610 and node 612, which is ($0+$14)/2=$7. The cost of the left connection of the virtual node comprised in the conditional connection CC1 is half of the summation of node 612 and the virtual node, which is ($14+$13)/2=$13.5 and the cost of the right connection of the virtual node comprised in the conditional connection CC1 is half of the summation of the virtual node and node 604, which is ($13+$0)/2=$6.5.

Also, in FIG. 6D, another node VMWare with corresponding connections together with respective costs in dash lines is shown, which corresponds to another user requirement 'to run SQL server on VMWare', as a comparison with the aforementioned user requirement. According to an embodiment of the present invention, different structural topologies may be built for different user requirements, and a cost comparison may be conducted for different user requirements so that the better upgrade recommendations may be provided. For example, a path that costs least from the node SQL server to the node Windows® may be calculated using Dijkstra's Algorithm, based on which upgrade recommendation with the least cost may be provided. It should be pointed out that Dijkstra's Algorithm is merely an example of calculating the path with the lowest cost, any other suitable algorithm may be utilized to calculate the path with the lowest cost.

Referring back to FIG. 4, after the structural topology of the IT system have been built in accordance with the existing components and the at least one user component determined in step S404 and S406, the method 400 proceeds to step S410, in which upgrade recommendations for the IT system are provided in accordance with the structural topology. According to an embodiment of the present invention, upgrade recommendations for the IT system may be provided together with cost information further in accordance with the respective costs. Again, referring to FIG. 6A to 6D, upgrade recommendations for the IT system may be provided in the following formats:

1) components to be purchased: {Vagrant, Docker};
2) components to be purchased: {Vagrant ($13), Docker ($14)};
3) components to be purchased:
   {Vagrant ($13), Docker ($14)} or
   {VMWare ($30), Docker ($14)}; or 4) components to be purchased at the lowest costs:
   {Vagrant ($13), Docker ($14)}.

It should be pointed out that above mentioned upgrade recommendations for the IT system are merely for the purpose of illustration, the recommendations may in any other suitable forms.

It should be noted that the processing IT system upgrades according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for upgrading an IT system, comprising:
    determining, by one or more processing units, a plurality of existing components of the IT system;
    determining, by one or more processing units through a natural language process to extract respective metadata for at least one user component, the at least one user component based on a user requirement specifying an upgrade to the IT system by adding the at least one user component to the IT system, the user component is absent from the IT system prior to the upgrade;
    building, by one or more processing units, a structural topology of the IT system in accordance with the plurality of existing components and the at least one user component, the structural topology comprising:
        a plurality of nodes representing the plurality of existing components;
        at least one connection between nodes of the plurality of nodes, the at least one connection representing at least one dependency among the plurality of existing components;
        a first node distinct from the plurality of nodes, the first node representing the at least one user component;
        a conditional node distinct from the first node and the plurality of nodes;
        a first connection between the conditional node and the first node;
        a second connection between the conditional node and a second node of the plurality of nodes, the second node representing a first existing component of the plurality of existing components; and
        a third connection between the second node and a third node of the plurality of nodes, the third node representing a second existing component of the plurality of existing components, wherein the third connection represents a dependency between the first existing component and the second existing component, and wherein the conditional node, the first connection, the second connection, and the third connection represent a dependency between the at least one user component and the first existing component and a dependency between the at least one user component and the second existing component even though there is no connection between the first node and the third node in the structural topology; and
    providing, by one or more processing units, at least one upgrade recommendation for the IT system in accordance with the structural topology.

2. The computer-implemented method of claim 1, further comprising:
    extracting, by one or more processing units, respective metadata for the plurality of existing components; and
    building, by one or more processing units, the structural topology of the IT system in accordance with the respective extracted metadata for the plurality of existing components and the respective metadata for the at least one user component.

3. The computer-implemented method of claim 2, wherein the respective extracted metadata for the plurality of existing components and the respective metadata for the at least one user component comprises:
    compatibility information of the plurality of existing components and the at least one user component; and
    dependency information of the plurality of existing components and the at least one user component.

4. The computer-implemented method of claim 3, further comprising verifying, by one or more processing units, compatibility of the plurality of existing components and the at least one user component in accordance with the compatibility information.

5. The computer-implemented method of claim 1, further comprising:
    receiving, by one or more processing units, respective costs for the plurality of existing components and the at least one user component;
    associating, by one or more processing units, the respective costs with the plurality of existing components and the at least one user component in the structural topology of the IT system; and
    providing, by one or more processing units, at least one upgrade recommendation for the IT system with cost information further in accordance with the respective associated costs.

6. The computer-implemented method of claim 5, wherein the at least one upgrade recommendation for the IT system comprises a recommendation with a lowest costs.

7. The computer-implemented method of claim 1, wherein the conditional node comprises a collection of all dependencies of the at least one user component on the plurality of existing components of the IT system.

8. A computer program product for upgrading an IT system, the computer program product comprising a non-transitory computer readable storage having program instructions embodied therewith, the program instructions executable by a computer, to cause the computer to perform a method comprising:
    determining a plurality of existing components of the IT system;
    determining, through a natural language process to extract respective metadata for at least one user component, the at least one user component based on a user requirement specifying an upgrade to the IT system by adding the at least one user component to the IT system, the user component is absent from the IT system prior to the upgrade;
    building a structural topology of the IT system in accordance with the plurality of existing components and the at least one user component, the structural topology comprising:
        a plurality of nodes representing the plurality of existing components;
        at least one connection between nodes of the plurality of nodes, the at least one connection representing at least one dependency among the plurality of existing components;

a first node distinct from the plurality of nodes, the first node representing the at least one user component;

a conditional node distinct from the first node and the plurality of nodes;

a first connection between the conditional node and the first node;

a second connection between the conditional node and a second node of the plurality of nodes, the second node representing a first existing component of the plurality of existing components; and a third connection between the second node and a third node of the plurality of nodes, the third node representing a second existing component of the plurality of existing components, wherein the third connection represents a dependency between the first existing component and the second existing component, and wherein the conditional node, the first connection, the second connection, and the third connection represent a dependency between the at least one user component and the first existing component and a dependency between the at least one user component and the second existing component even though there is no connection between the first node and the third node in the structural topology; and providing at least one upgrade recommendation for the IT system in accordance with the structural topology.

9. The computer program product of claim 8, the method further comprising:

extracting respective metadata for the plurality of existing components; and building the structural topology of the IT system in accordance with the respective extracted metadata for the plurality of existing components and the respective metadata for the at least one user component.

10. The computer program product of claim 9, wherein the respective extracted metadata for the plurality of existing components and the respective metadata for the at least one user component comprises:

compatibility information of the plurality of existing components and the at least one user component; and dependency information of the plurality of existing components and the at least one user component.

11. The computer program product of claim 10, the method further comprising verifying compatibility of the plurality of existing components and the at least one user component in accordance with the compatibility information.

12. The computer program product of claim 8, the method further comprising:

receiving respective costs for the plurality of existing components and the at least one user component;

associating the respective costs with the plurality of existing components and the at least one user component in the structural topology of the IT system; and providing at least one upgrade recommendation for the IT system with cost information further in accordance with the respective associated costs.

13. The computer program product of claim 12, wherein the at least one upgrade recommendation for the IT system comprises a recommendation with a lowest costs.

14. The computer program product of claim 8, wherein the conditional node comprises a collection of all dependencies of the at least one user component.

15. A system for upgrading an IT system, the system comprising a processor, memory accessible by the processor, and computer program instructions stored in the memory and executable by the processor to perform a method comprising:

determining a plurality of existing components of the IT system;

determining, through a natural language process to extract respective metadata for at least one user component, the at least one user component based on a user requirement specifying an upgrade to the IT system by adding the at least one user component to the IT system, the user component is absent from the IT system prior to the upgrade;

building a structural topology of the IT system in accordance with the plurality of existing components and the at least one user component, the structural topology comprising:

a plurality of nodes representing the plurality of existing components;

at least one connection between nodes of the plurality of nodes, the at least one connection representing at least one dependency among the plurality of existing components;

a first node distinct from the plurality of nodes, the first node representing the at least one user component;

a conditional node distinct from the first node and the plurality of nodes;

a first connection between the conditional node and the first node;

a second connection between the conditional node and a second node of the plurality of nodes, the second node representing a first existing component of the plurality of existing components; and a third connection between the second node and a third node of the plurality of nodes, the third node representing a second existing component of the plurality of existing components, wherein the third connection represents a dependency between the first existing component and the second existing component, and wherein the conditional node, the first connection, the second connection, and the third connection represent a dependency between the at least one user component and the first existing component and a dependency between the at least one user component and the second existing component even though there is no connection between the first node and the third node in the structural topology; and providing at least one upgrade recommendation for the IT system in accordance with the structural topology.

16. The system of claim 15, the method further comprising:

extracting respective metadata for the plurality of existing components; and building the structural topology of the IT system in accordance with the respective extracted metadata for the plurality of existing components and the respective metadata for the at least one user component.

17. The system of claim 16, wherein the respective extracted metadata for the plurality of existing components and the respective metadata for the at least one user component comprises:

compatibility information of the plurality of existing components and the at least one user component; and dependency information of the plurality of existing components and the at least one user component.

18. The system of claim 17, the method further comprising verifying compatibility of the plurality of existing components and the at least one user component in accordance with the compatibility information.

19. The system of claim 15, the method further comprising:
  receiving respective costs for the plurality of existing components and the at least one user component;
  associating the respective costs with the plurality of existing components and the at least one user component in the structural topology of the IT system; and
  providing at least one upgrade recommendation for the IT system with cost information further in accordance with the respective associated costs.

20. The system of claim 15, wherein the conditional node comprises a collection of all dependencies of the at least one user component.

* * * * *